(12) United States Patent
Aoki et al.

(10) Patent No.: US 6,268,894 B1
(45) Date of Patent: Jul. 31, 2001

(54) LCD HAVING CAPACITOR LINES WITH PARTICULAR STRUCTURES

(75) Inventors: Yoshiro Aoki; Hajime Sato, both of Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 08/655,771

(22) Filed: May 31, 1996

(30) Foreign Application Priority Data

Jun. 2, 1995 (JP) ................................................ 7-136655

(51) Int. Cl.$^7$ ................................................ G02F 1/1343
(52) U.S. Cl. ................................................ 349/39; 349/38
(58) Field of Search ........................................ 349/39, 38

(56) References Cited

U.S. PATENT DOCUMENTS

| | | | | |
|---|---|---|---|---|
| 4,582,395 | * | 4/1986 | Morozumi | 349/39 |
| 5,159,476 | * | 10/1992 | Hayashi | 349/39 |
| 5,305,128 | * | 4/1994 | Stupp et al. | 349/39 |
| 5,394,258 | * | 2/1995 | Morin et al. | 349/39 |
| 5,453,857 | * | 9/1995 | Takahara | 349/48 |
| 5,457,553 | * | 10/1995 | Mori | 349/39 |
| 5,517,342 | * | 5/1996 | Kim et al. | 349/139 |

FOREIGN PATENT DOCUMENTS 64-73324   3/1989   (JP).

* cited by examiner

Primary Examiner—William L. Sikes
Assistant Examiner—Toan Ton
(74) Attorney, Agent, or Firm—Pillsbury Madison & Sutro LLP

(57) ABSTRACT

A liquid crystal display apparatus having a plurality of pixel cells is disclosed, each of which comprising a scanning line and a signal line disposed on an insulation substrate in such a manner that the scanning line intersects with the signal line, a switching device disposed at the intersection of the scanning line and the signal line, a display pixel electrode electrically connected to the switching device, an opposite electrode disposed opposite to the display pixel electrode through a liquid crystal layer, and an auxiliary capacitor line disposed in a space between two adjacent display pixel electrodes in parallel with the scanning line and capacitively coupled with the display pixel electrode so as to form an auxiliary capacitor, wherein the scanning line overlaps with the display pixel electrode.

12 Claims, 15 Drawing Sheets

FIG. 16
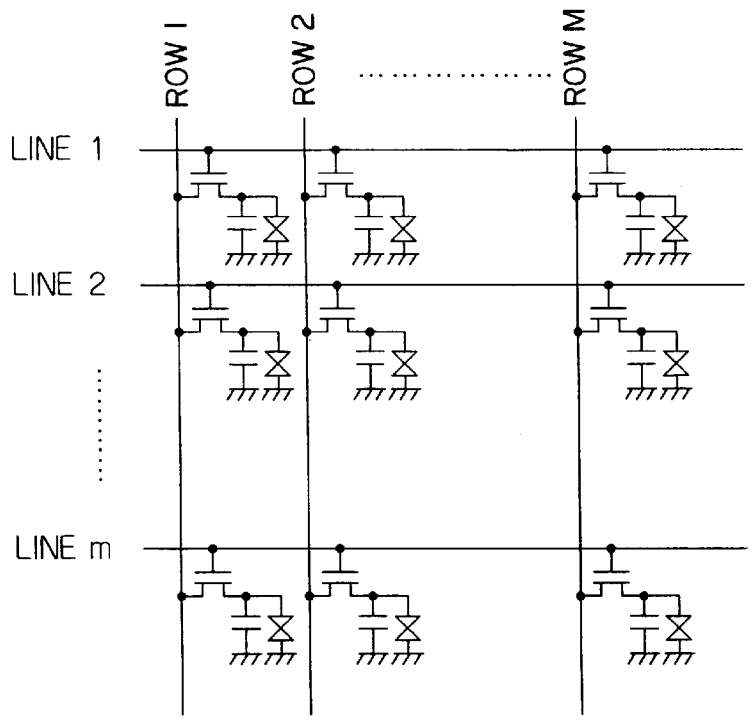
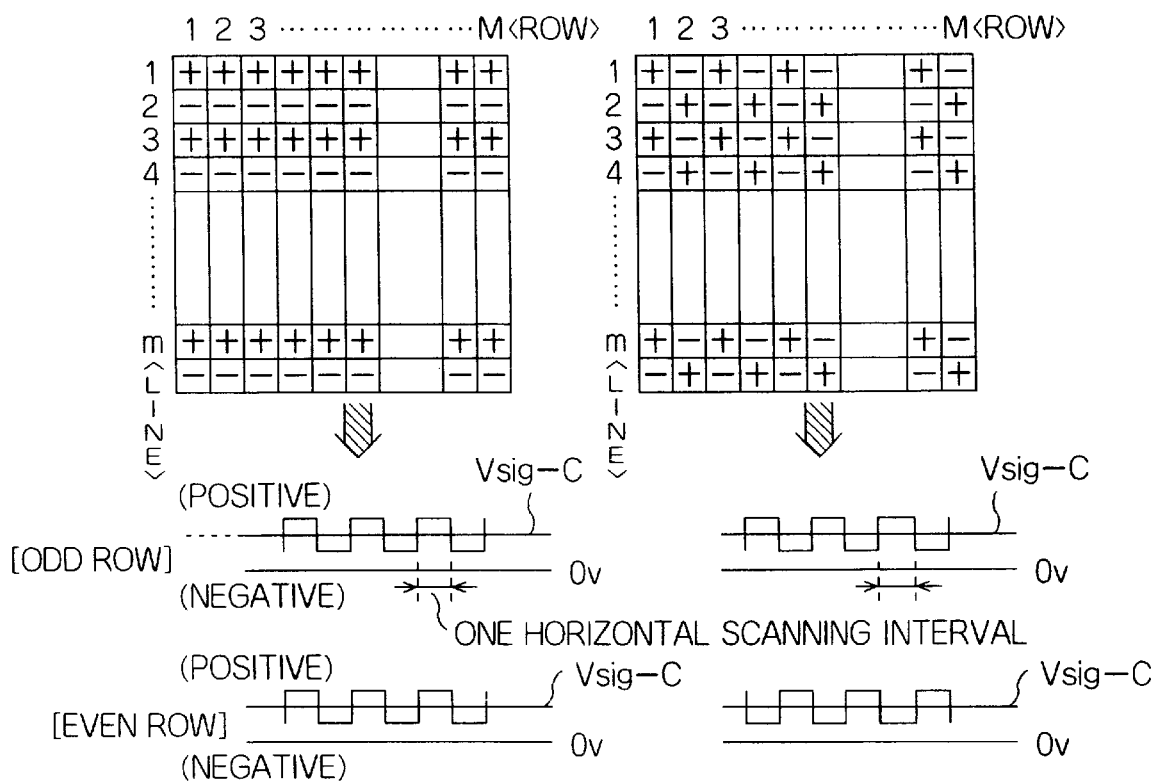

LCD HAVING CAPACITOR LINES WITH PARTICULAR STRUCTURES

BACKGROUND OF THE INVENTION

1. Field of the Invention

The present invention relates to an active matrix type liquid crystal display apparatus with a high aperture ratio of a pixel portion.

2. Description of the Related Art

Liquid crystal display apparatuses have been widely used as display devices for TV sets and graphics display devices due to their advantageous features of thin structure and low power consumption. Among liquid crystal display, an active matrix type liquid crystal display apparatus using thin film transistors (referred to as TFTS) as switching devices has high speed response characteristic and high precision characteristics, making it an attractive choice for high picture quality, large size, and color pictures.

Each display device portion of such an active matrix type liquid crystal display apparatus is generally composed of a switching active device (such as a TFT), an active device array substrate, an opposite substrate, a liquid crystal material, and polarizing plates. The active device array substrate has a pixel electrode connected to the switching active device. The opposite substrate has an opposite electrode disposed opposite to the active device array substrate. The liquid crystal material is disposed between the active device array substrate and the opposite substrate. The polarizing plates are disposed outside of the two substrates. In the active matrix type liquid crystal display apparatus, each liquid crystal pixel cell corresponding to each pixel is composed of the pixel electrode, the opposite electrode, and the liquid crystal layer.

By varying a voltage supplied to each pixel electrode, the optical state of liquid crystal molecules in the liquid crystal pixel cell is changed and thereby a picture is displayed on the screen. An electric field corresponding to a picture signal voltage is not supplied to a liquid crystal layer disposed outside the pixel electrodes (namely, the non-pixel region). Thus, the non-pixel region is optically shielded. By varying an electric field of a pixel portion in which a pixel electrode is formed, the optical state of the liquid crystal layer of the pixel portion is changed and thereby a picture is displayed.

To reduce the entire power consumption of the liquid crystal display apparatus, the non-pixel region that is optically shielded should be minimized and thereby the aperture ratio of the pixel portion should be maximized to improve the optical use efficiency of the display apparatus.

As a related art reference, a technology for improving the aperture ratio of a pixel portion has been disclosed as Japanese Patent Laid-Open Publication No. 1-73324. In this related art reference, one auxiliary capacitor line is disposed between two adjacent pixel electrodes. The auxiliary capacitor line is shared by the two adjacent pixel electrodes.

However, the liquid crystal pixel cell corresponding to each pixel tends to be affected by the electric field that takes place between signal lines and scanning lines disposed on pixel electrodes and the vicinity thereof. As a result, the liquid crystal molecules in the vicinity of a peripheral portion of the pixel electrode are reversed. (This situation is referred to as edge reverse phenomenon.) In other words, the liquid crystal molecules in the vicinity of the peripheral portion of the pixel electrode are affected by the electric field that takes place between signal lines and scanning lines as well as by the electric field that precisely corresponds to a picture signal voltage of a picture signal supplied from the pixel electrode. As a result, the optical state of each pixel portion does not precisely correspond to the picture signal. Consequently, light leaks out at the peripheral portion of each pixel portion, thereby decreasing the contrast of the picture. Thus, the display quality of the screen is remarkably deteriorated.

SUMMARY OF THE INVENTION

The present invention is made from the above-described point of view.

A first object of the present invention is to provide a liquid crystal display apparatus that has a high aperture ratio of the pixel portion, suppresses the edge reverse phenomenon, and thereby decreases power consumption and improves of the display quality of the screen.

A second object of the present invention is to provide a liquid crystal display apparatus that prevents the aperture ratio of the pixel portion from decreasing against an alignment process in an array forming step and a cell forming step.

A third object of the present invention is to provide a liquid crystal display apparatus that prevents a penetration voltage corresponding to a voltage supplied to each scanning line from taking place, thereby improving display quality and reliability.

A fourth object of the present invention is to provide a liquid crystal display apparatus that does not need to form a light shielding layer, thereby remarkably simplifying a fabrication process thereof.

A fifth object of the present invention is to provide a liquid crystal display apparatus that prevents a cross-talk from taking place, thereby remarkably improving the display quality thereof.

To accomplish the above-described objects, a first aspect of the present invention is a liquid crystal display apparatus having a plurality of pixel cells, each of which comprise a scanning line and a signal line disposed on an insulation substrate such that the scanning line intersects with the signal line, a switching device disposed at the intersection of the scanning line and the signal line, a display pixel electrode electrically connected to the switching device, an opposite electrode disposed opposite to the display pixel electrode through a liquid crystal layer, and an auxiliary capacitor line disposed in a space between two adjacent display pixel electrodes and capacitively coupled with the display pixel electrode to form an auxiliary capacitor, wherein the scanning line overlaps with the display pixel electrode.

A second aspect of the present invention is a liquid crystal display apparatus having a plurality of pixel cells, each of which comprises a scanning line and a signal line disposed on an insulation substrate such that the scanning line intersects with the signal line, a switching device disposed at the intersection of the scanning line and the signal line, a display pixel electrode electrically connected to the switching device, an opposite electrode disposed opposite to the display pixel electrode through a liquid crystal layer, and an auxiliary capacitor line disposed in a space between two adjacent display pixel electrodes and capacitively coupled with the display pixel electrode to form an auxiliary capacitor, wherein the display pixel electrode capacitively couples with the auxiliary capacitor electrode disposed corresponding to the opposite side of the display pixel electrode and electrically shielded therefrom.

These and other objects, features and advantages of the present invention will become more apparent in light of the

BRIEF DESCRIPTION OF THE DRAWINGS

FIG. 16 is a schematic diagram showing an example of a driving method of a liquid crystal display apparatus according to the present invention.

DESCRIPTION OF THE PREFERRED EMBODIMENTS

Next, with reference to the accompanying drawings, an embodiment of the present invention will be described.

Figure 1:
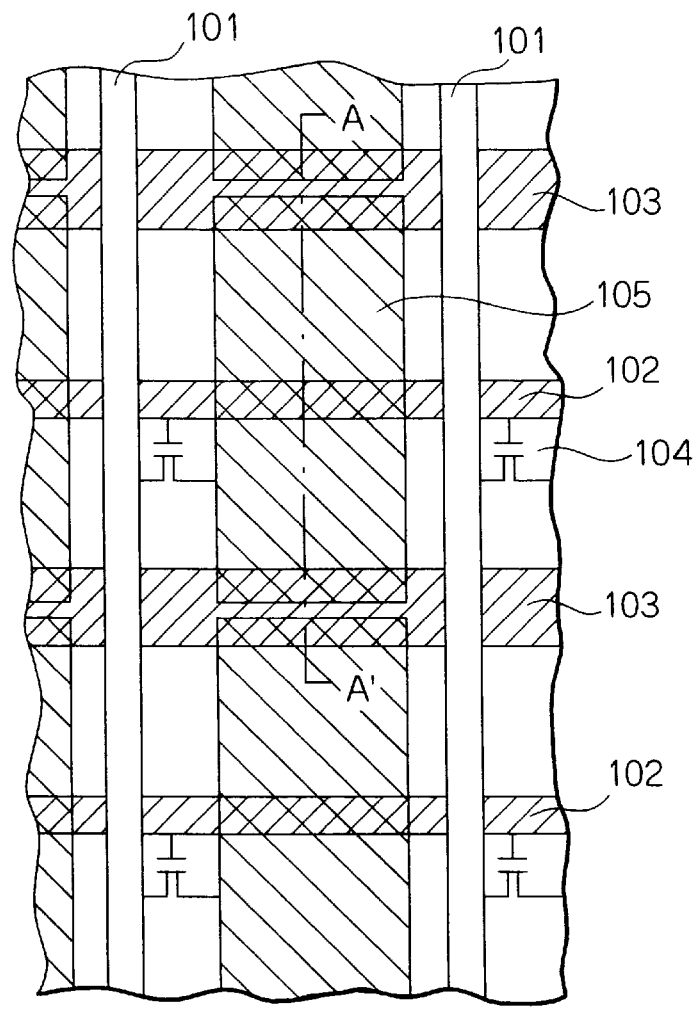
FIG. 1 is a plan view schematically showing a structure of a matrix substrate composed of a transparent insulation film of a liquid crystal display apparatus according to a first embodiment of the present invention.

FIG. 1 is a plan view schematically showing a structure of a matrix substrate composed of a transparent insulation film for a liquid crystal display apparatus according to a first embodiment of the present invention.

In the following description, only one pixel portion of the liquid crystal display apparatus will be explained for simplicity.

As shown in FIG. 1, a plurality of signal lines 101 and a plurality of scanning lines 102 are disposed on a matrix substrate (not shown) in such a manner that the signal lines 101 intersect with the scanning lines 102. A TFT 104 used as a switching device of the pixel portion is disposed at the intersection of a signal line and a scanning line. A pixel electrode 105 is electrically connected to the TFT 104. An auxiliary capacitor line 103 is disposed between two adjacent pixel electrodes 105 parallel to the scanning line 102.

Figure 2:
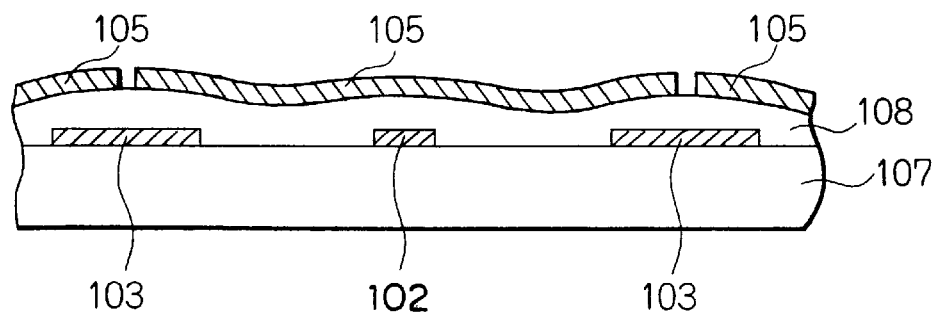
FIG. 2 is a vertical sectional view taken along line A–A' shown in FIG. 1.

FIG. 2 is a vertical sectional view taken along line A–A' shown in FIG. 1.

As shown in FIG. 2, the auxiliary capacitor line 103 has a portion that overlaps with two adjacent pixel electrodes 105. The overlap portion of the auxiliary capacitor line 103 capacitively couples with the pixel electrodes 105 and thereby forms an auxiliary capacitor. The scanning line 102 overlaps with the pixel electrode 105. In FIG. 2, reference numeral 107 is a matrix substrate. An insulation layer 108 is disposed between the pixel electrode 105 and the matrix substrate 107 on which the scanning line 102 and the auxiliary capacitor line 103 are disposed. The scanning line 102 is disposed below the pixel electrode 105 in the insulation layer 108.

Figure 3:
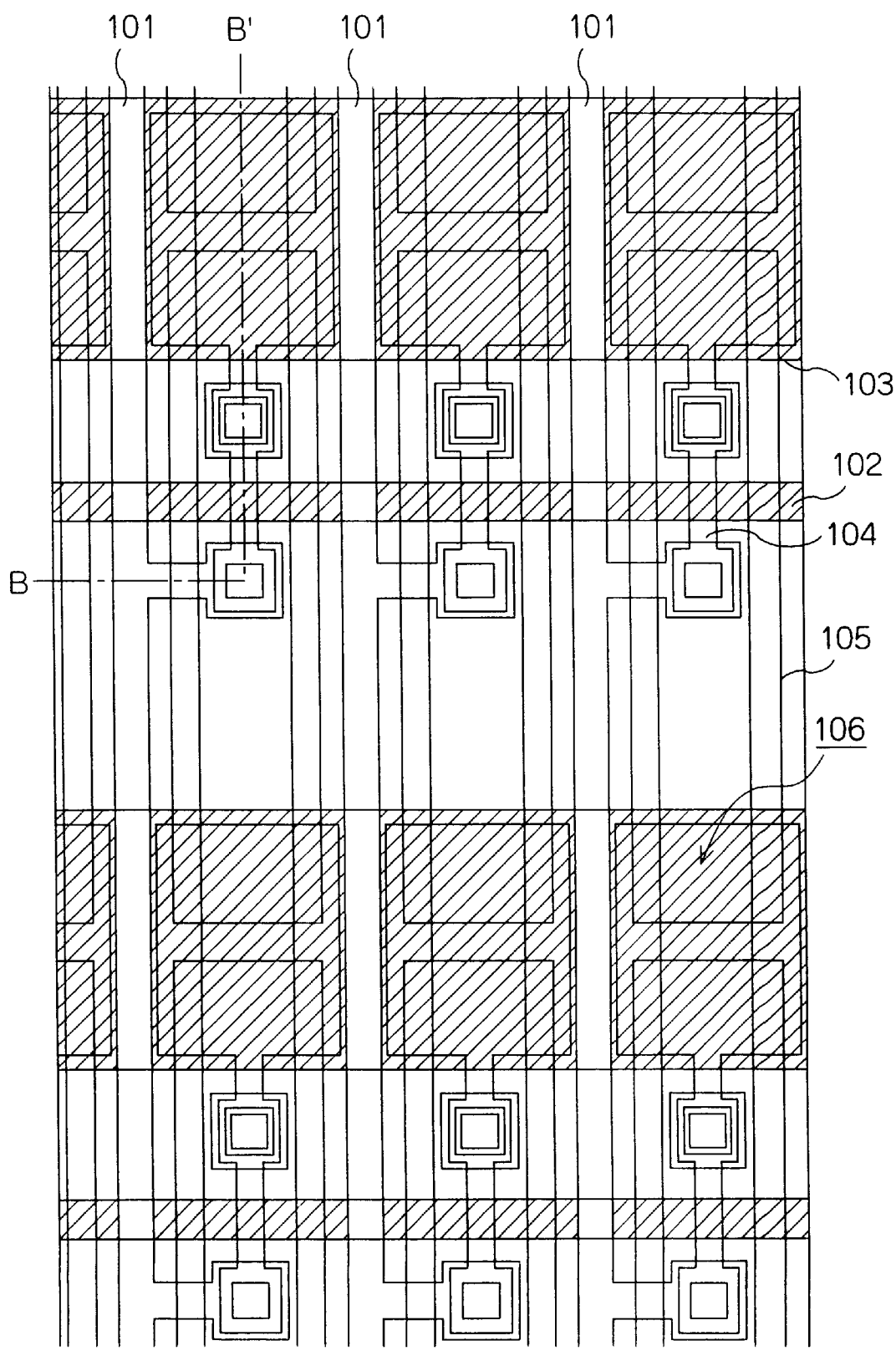
FIG. 3 is a plan view showing a peripheral portion of a TFT shown in FIG. 1.
Figure 4:
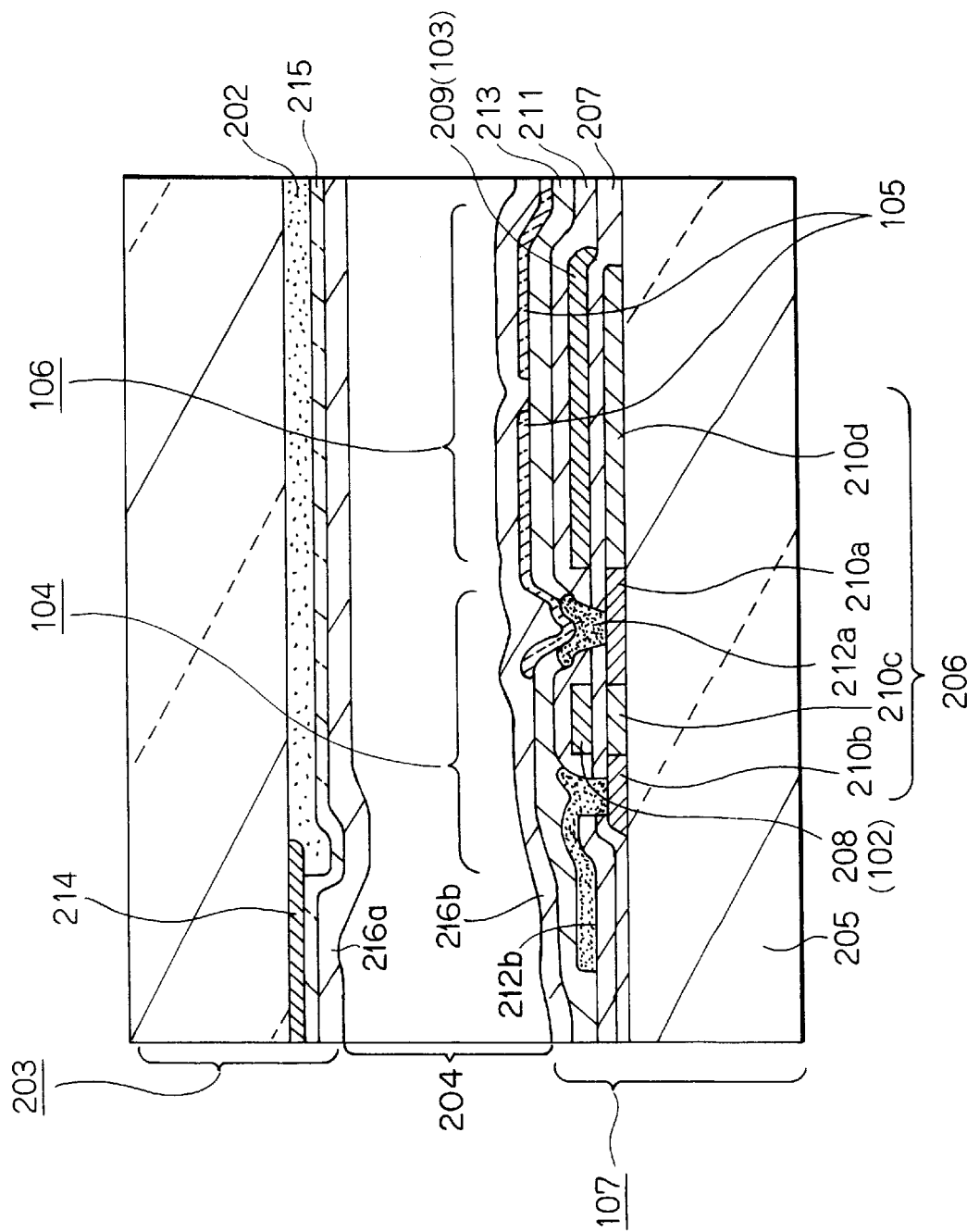
FIG. 4 is a vertical sectional view taken along line B–B' shown in FIG. 3.

FIG. 3 is a plan view showing a peripheral portion of the TFT 104. In FIG. 3, a portion where the scanning line 102 overlaps with the pixel electrode 105 and the auxiliary capacitor line 103 are highlighted by hatching. FIG. 4 is a vertical sectional view taken along line B–B' shown in FIG. 3.

As shown in FIG. 4, a liquid crystal 204 is disposed between a matrix substrate 107 that is composed of a transparent insulation film and an opposite substrate 203 that has a color filter 202. As a result, a liquid crystal cell is formed.

The TFT 104 (which is a switching device), an auxiliary capacitor 106, and so forth are formed on the matrix substrate 107 using a low temperature polysilicon process.

Next, a fabrication method of the matrix array substrate 107 will be described briefly.

Figure 5:
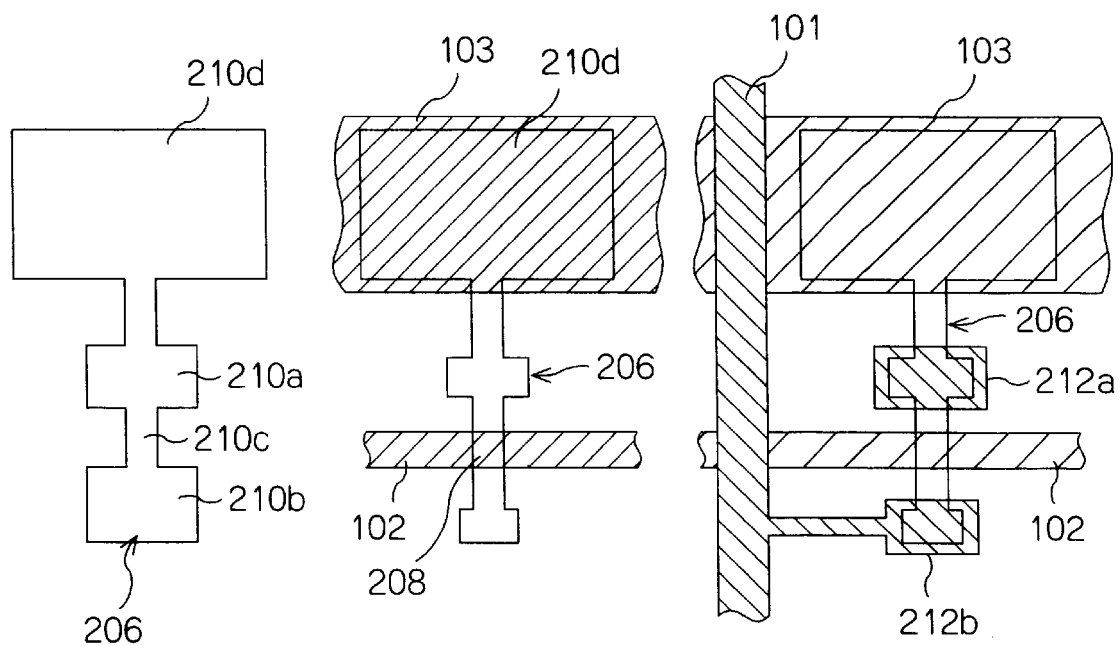
FIG. 5A is a plan view showing a polycrystal silicon film shown in FIG. 4.
FIG. 5B is a plan view showing a scanning line and an auxiliary capacitor line shown in FIG. 4.
FIG. 5C is a plan view showing a source electrode, a drain electrode, and a signal line shown in FIG. 4.

An amorphous silicon film is formed on a transparent insulation substrate 205 by the plasma CVD method. Thereafter, the amorphous silicon film is patterned and recrystallized by radiating excimer laser light into the substrate 205. As a result, a polycrystal silicon film 206 is obtained. As shown in FIG. 5A, the polycrystal silicon film 206 has a source region 210a, a drain region 210b, a channel region 210c formed therebetween, an electrode portion 210d forming a capacitor with the auxiliary capacitor line 103.

Thereafter, by the normal pressure CVD method, a silicon oxide film 207 for a gate insulation film and an auxiliary capacitor insulation film is formed. Next, by the spatter method, a Mo (molybdenum)—W(tungsten) film is formed. The film is patterned. As a result, a gate electrode 208 of the TFT 104 and an upper electrode 209 of the auxiliary capacitor (Cs) 106 are obtained. The gate electrode 208 shown in FIG. 4 is a portion that functions as a gate electrode of the scanning line 102. The upper electrode 209 shown in FIG. 4 is a portion that forms the auxiliary capacitor (Cs) 106 of the auxiliary capacitor line 103. FIG. 5B is a plan view showing the scanning line 102 and the auxiliary capacitor line 103 on the layer.

Thereafter, using a mask of the gate electrode 208 and the upper electrode 209, impurities are doped in the source region 210a and the drain region 210b of the TFT 104 using the ion doping method.

Next, by the normal pressure CVD method, an inter-layer insulation film 211 is formed. After contact holes are formed, an aluminum film is formed by the spatter method. By patterning the aluminum film, a source electrode 212a and a drain electrode 212b are formed. FIG. 5C is a plan view showing the source electrode 212a, the drain electrode 212b, and the signal line 101 on the layer.

Thereafter, a second inter-layer insulation film 213 is formed. After contact holes are formed, an ITO film as a transparent conductor film is formed. The ITO film is patterned and thereby the pixel electrode 105 is formed.

It should be noted that the fabrication method of the TFT 104, which is used as a switching device of the pixel portion, is not limited to the above-described method that forms the TFT 104 as a p-Si TFT.

On the other hand, an opposite electrode 215 composed of a color filter 202, a black matrix 214, and a transparent conductor film is formed on the opposite substrate 203.

Polyimide films for controlling the alignment direction of the liquid crystal are formed at the top layers of both substrates. An alignment process is performed for the surfaces of the polyimide films and thereby alignment films 216a and 216b are formed. By injecting the liquid crystal 204 into a space between both the substrates, a liquid crystal cell is formed.

In the above-described embodiment, the auxiliary capacitor is a MOS type auxillary capacitor. However, to supply any voltage to the auxiliary capacitor line 103, it is preferable to dope impurities to a lower electrode 218 of the auxiliary capacitor 106 and thereby form a MIM-type auxiliary capacitor.

In addition, when the switching device has a structure for reducing the electric filed in the vicinity of the drain region (for example, the LDD structure), tunnel current in the vicinity of the drain region can be reduced, thereby decreased a leak current.

Moreover, as impurities for forming the source region 210a and the drain region 210b, n-type impurities such as phosphorus ions can be used. Alternatively, with p-type impurities such as boron ions, the same effect as the above-described embodiment can be accomplished.

If a liquid crystal driver circuit (not shown) is integrally formed on the matrix array substrate 107, when the liquid crystal driver circuit is formed as a CMOS structure, a high speed driving operation can be accomplished with low power consumption. In the liquid crystal display apparatus according to the above-described embodiment, because the scanning line 102 is disposed in such a manner that it overlaps with the pixel electrode 105 (in other words, the scanning line 102 is formed below the pixel electrode 105 through the insulation layer 108), the area of the scanning line 102 on the matrix substrate 107 is very small. Thus, the aperture ratio of the pixel portion can be improved. In addition, since the scanning line 102 is electrically shielded from the liquid crystal molecules by the pixel electrode 105, the edge reverse phenomenon can be suppressed. Moreover, with the shielded structure, the time constant of the scanning line 102 can be prevented from varying in response to the dielectric constant of the liquid crystal molecules. Thus, the degree of freedom of the design and selection of the liquid crystal material becomes high.

Figure 6:
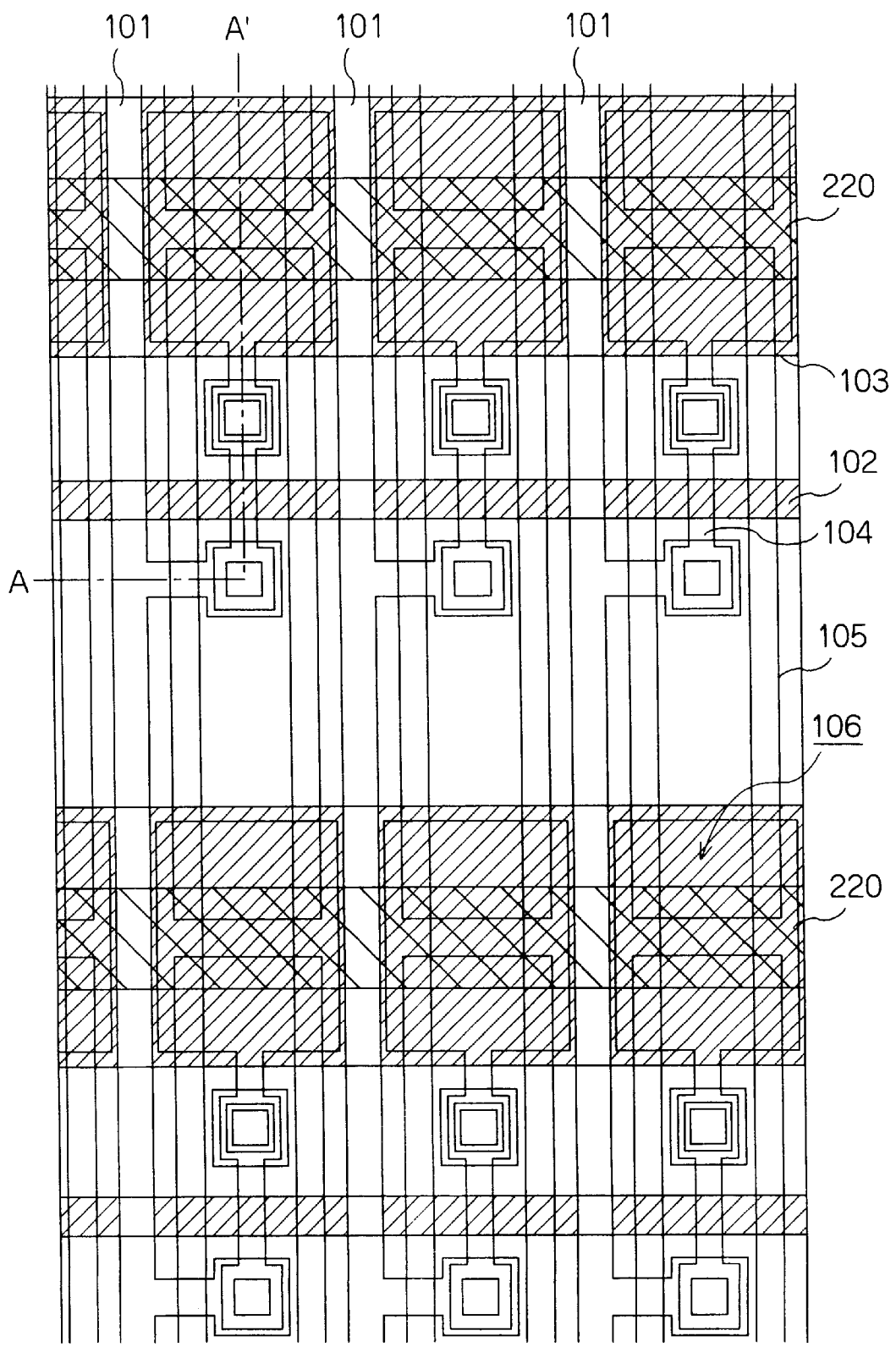
FIG. 6 is a plan view showing a matrix substrate according to a modification of the first embodiment of the present invention.

Furthermore, with the above-described structure, since the auxiliary capacitor line 103 also functions as a light shielding member that covers the non-pixel portion and the TFT 104 as well as the black matrix 214, the portion of the black matrix 214 corresponding to the scanning line 102 can be omitted. Thus, in the direction of the scanning line 102, it is not necessary to consider the matching accuracy in the cell forming step for forming the black matrix 214 on the opposite substrate, the matching accuracy for forming the black matrix 214 on the matrix array substrate 107, or the machining accuracy for the black matrix 214. Consequently, the aperture ratio of the pixel portion can be remarkably improved. However, the auxiliary capacitor line 103 may be composed of a transparent material. In this case, as shown in FIG. 6, a light shielding layer 220 is preferably disposed in the region of the auxiliary capacitor lines 103. In other words, the width of the light shielding layer 220 is preferably smaller than the width of the auxiliary capacitor line 103. Thus, the aperture ratio of the pixel portion can be further improved. It is also possible to use a structure where the width of the light shielding layer 220 is equal to or larger than the width of the auxiliary capacitor line 103. The light shielding layer 220 is formed on, for example, the pixel electrode 105 shown in FIG. 4. However, the light shielding layer 220 can be formed on other than the pixel electrode 105 as well.

In the above-described embodiment, the auxiliary capacitor line 103 is disposed such that it overlaps with edge portions of two adjacent pixel electrodes 105. In addition, an auxiliary capacitor (Cs) 106 is disposed between adjacent pixels (namely, in a non-pixel portion). Thus, even if the capacitance of the auxiliary capacitor 106 increases due to a change of the shape of the TFT 104, the influence of the aperture ratio of the pixel portion against an increase of the capacitance can be remarkably suppressed.

In the above-described embodiment, since the auxiliary capacitor line 103 is disposed in such that it overlaps with the edge portions of adjacent two pixel electrodes 105, the state of the liquid crystal molecules in the region of the edge portions of the pixel electrodes 105 can be stably maintained with the voltage of the auxiliary capacitor line 103. Thus, the edge reverse phenomenon can be suppressed taking place in the peripheral portion of the pixel in the liquid crystal layer compared with when the scanning line 102 for repeatedly turning on and off the TFT 104 is disposed in the position. Consequently, the region of the black matrix 214 disposed for suppressing the edge reverse phenomenon can be omitted. As a result, the aperture ratio of the pixel portion and the display quality can be remarkably improved. When the voltage of the auxiliary capacitor line 103 is the same as the center value of the amplitude of the picture signal, the maximum effect can be obtained.

In addition, in the above-described embodiment, since the auxiliary capacitor line 103 and the scanning line 102 are independently formed, MOS type capacitor device can be used, unlike a structure in which the scanning line 102 and the auxiliary capacitor line 103 are commonly formed. Thus, the degree of freedom of the design of the device structure can be further improved in comparison with a conventional liquid crystal display apparatus.

Figure 7:
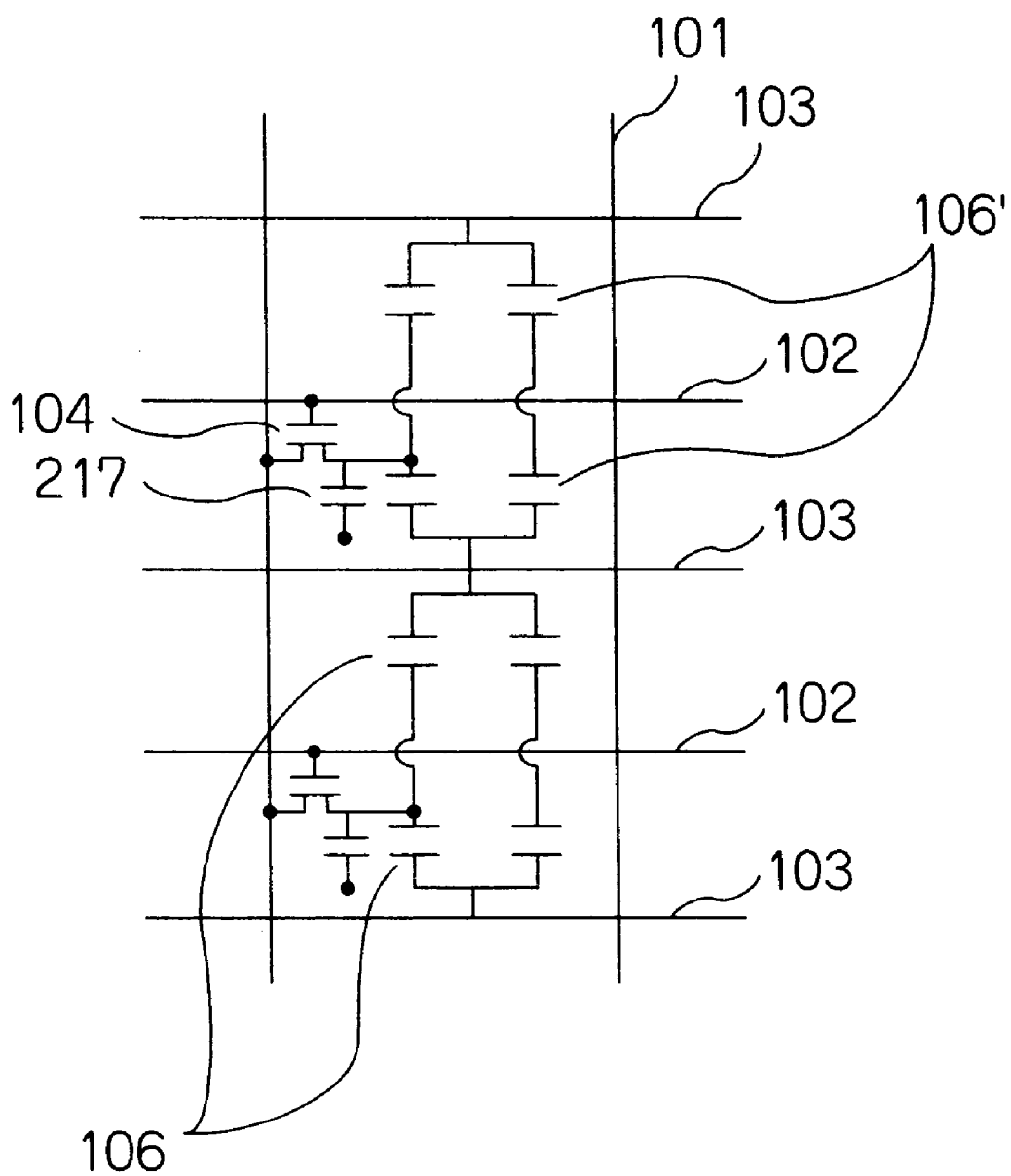
FIG. 7 is a schematic diagram showing an equivalent circuit of the liquid crystal display apparatus according to the first embodiment of the present invention.

In this embodiment, as shown in the equivalent circuit of FIG. 7, a static capacitor 106 is formed between the pixel electrode 105 and the auxiliary capacitor line 103 disposed opposite thereto through an inter-layer insulation film 211. On the other hand, a static capacitor 106' is formed between a lower electrode 210d and the auxiliary capacitor line 103 disposed opposite thereto through an inter-layer insulation film 207.

In this embodiment, as shown in FIG. 4, the inter-layer insulation film 211 functions as an inter-layer insulation film that insulates the signal line 101 and the pixel electrode 105. To reduce the coupling capacitance formed between the signal line 101 and the pixel electrode 105, the capacitance of the inter-layer insulation film 211 is preferably as small as possible. Thus, the voltage held by the pixel is minimally interfered by the voltage supplied to the signal line 101. Consequently, high picture quality can be accomplished.

On the other hand, the coupling capacitance formed between the auxiliary capacitor line 103 and the display pixel electrode 105 decreases. To compensate for the decrease of the coupling capacitance, in this embodiment, the semiconductor layer of the TFT 104 extends below the auxiliary capacitor line 103 to form a main auxiliary capacitor 106' between the layer 210d and the auxiliary capacitor line 103.

Alternatively, by reducing the thickness of the interlayer insulation film 211 disposed on the auxiliary capacitor line 103, the capacitor formed between the auxiliary capacitor line 103 and the pixel electrode 105 that overlaps therewith can be increased. Thus, as long as a proper static capacitance is formed, the lower electrode 210d can be omitted.

It should be appreciated that the present invention is not limited to the above-described embodiment. The structure of the TFT and the forming method thereof are not limited. In addition, the material of each line is not limited. The channel portion of the TFT 104 may be composed of amorphous Si or another material. Moreover, as the pixel switching device, a device other than the TFT may be used.

Figure 8:
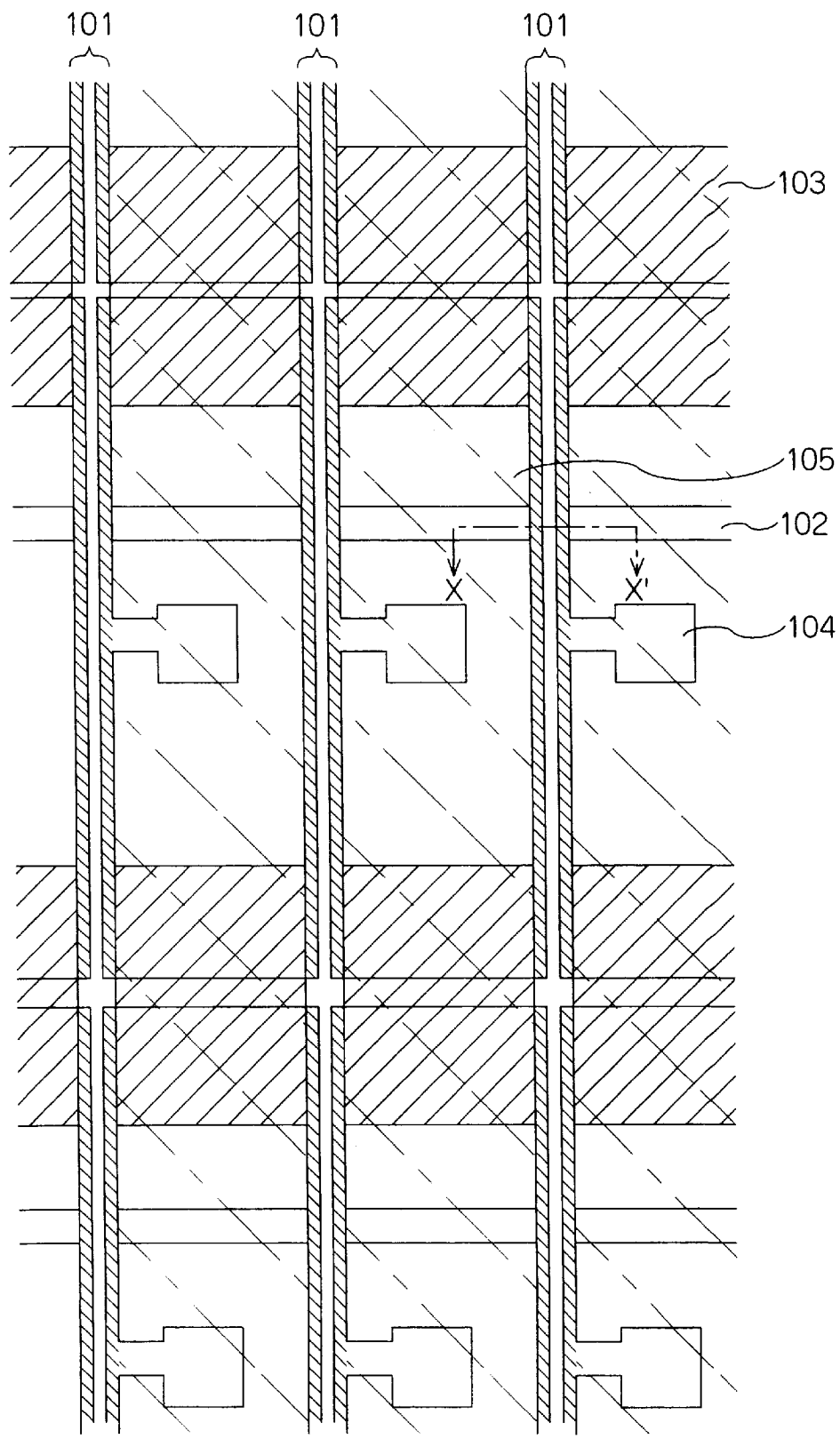
FIG. 8 is a plan view schematically showing a structure of a matrix substrate of a liquid crystal display apparatus according to a second embodiment of the present invention.
Figure 9:
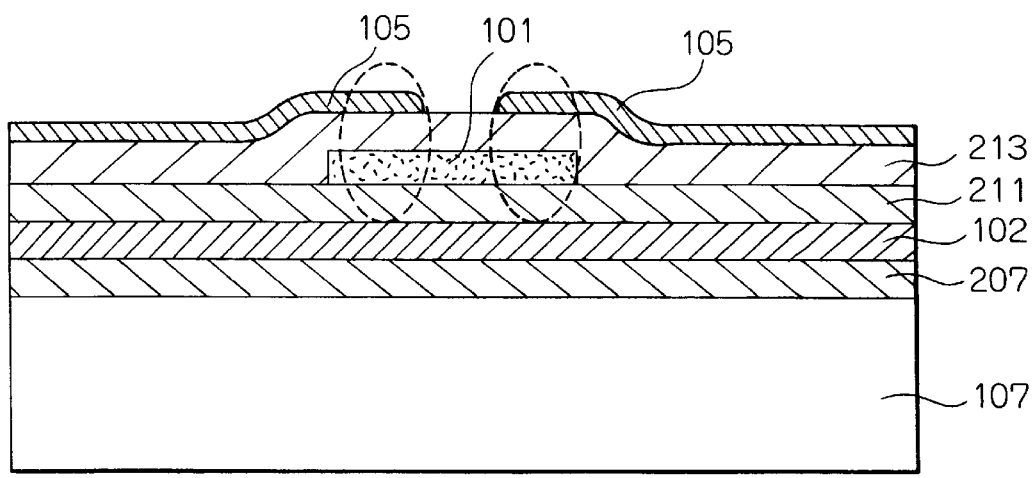
FIG. 9 is a vertical sectional view taken along line B–B' shown in FIG. 8.

FIGS. 8 and 9 show a second embodiment of the present invention. FIG. 8 is a plan view schematically showing a structure of a matrix substrate of a liquid crystal display apparatus according to the second embodiment of the present invention. FIG. 9 is a vertical sectional view taken along line B–B' shown in FIG. 8.

The structure of the liquid crystal display apparatus according to the second embodiment shown in FIGS. 8 and 9 is basically the same as the structure of the liquid crystal display apparatus according to the first embodiment shown in FIGS. 1 to 6. In other words, as shown in FIG. 9, a scanning line 102 is disposed on a matrix substrate 107 through a silicon oxide film 207. A signal line 101 is disposed on the scanning line 102 through a first inter-layer insulation film 211. A second inter-layer insulation film 213 is disposed on the signal line 101 such that the second interlayer insulation film 213 covers the signal line 101. A pixel electrode 105 is disposed on the second inter-layer insulation film 213. However, the second embodiment is different from the first embodiment in that a part of the signal line 101 overlaps with the pixel electrode 105 (the overlap portion is denoted by a dotted line in FIG. 9).

In the second embodiment, since a part of the signal line 101 overlaps with the pixel electrode 105, the area of the signal line 101 decreases. Thus, the aperture ratio of the pixel portion is improved. In addition, the signal line 101 is electrically shielded from liquid crystal molecules by the pixel electrode 105. Consequently, the edge reverse phenomenon can be suppressed.

Figure 10:
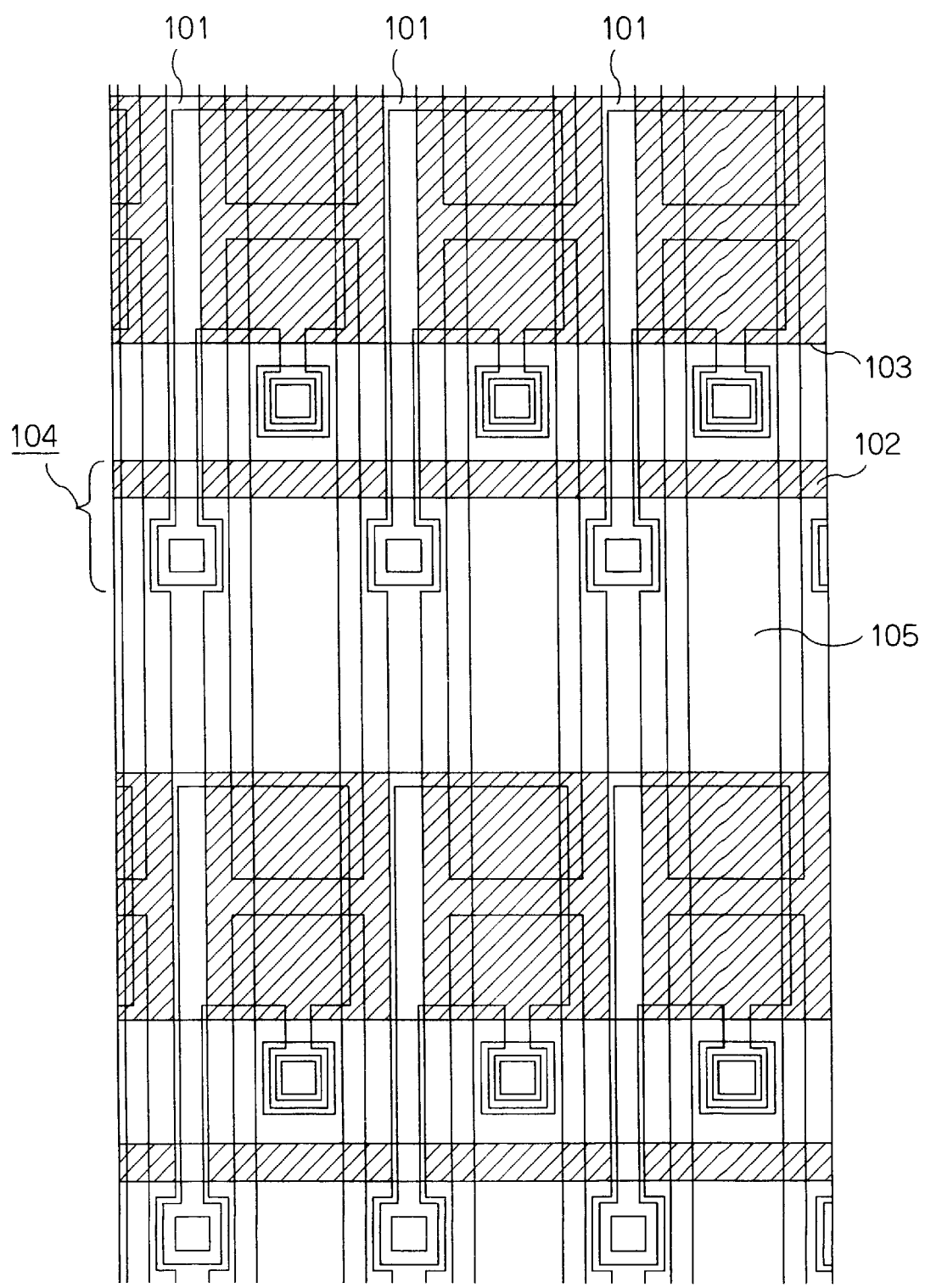
FIG. 10 is a plan view showing a pixel portion of a liquid crystal display apparatus according to a third embodiment of the present invention.

FIG. 10 is a plan view showing a pixel portion of a liquid crystal display apparatus according to a third embodiment of the present invention.

As shown in FIG. 10, since the TFT 104 is disposed in such a manner that it overlaps with a signal line 101, the signal line 101 can be used as a light insulation film of the TFT 104. In particular, an optical leak current due to back light or light from a projection light source can be prevented from taking place in the TFT 104.

Thus, it is not necessary to increase the capacitance of the auxiliary capacitor 106 for holding the picture signal of the pixel electrode 105. Consequently, the aperture ratio of the pixel portion and the display quality of the screen can be improved.

Figure 11:
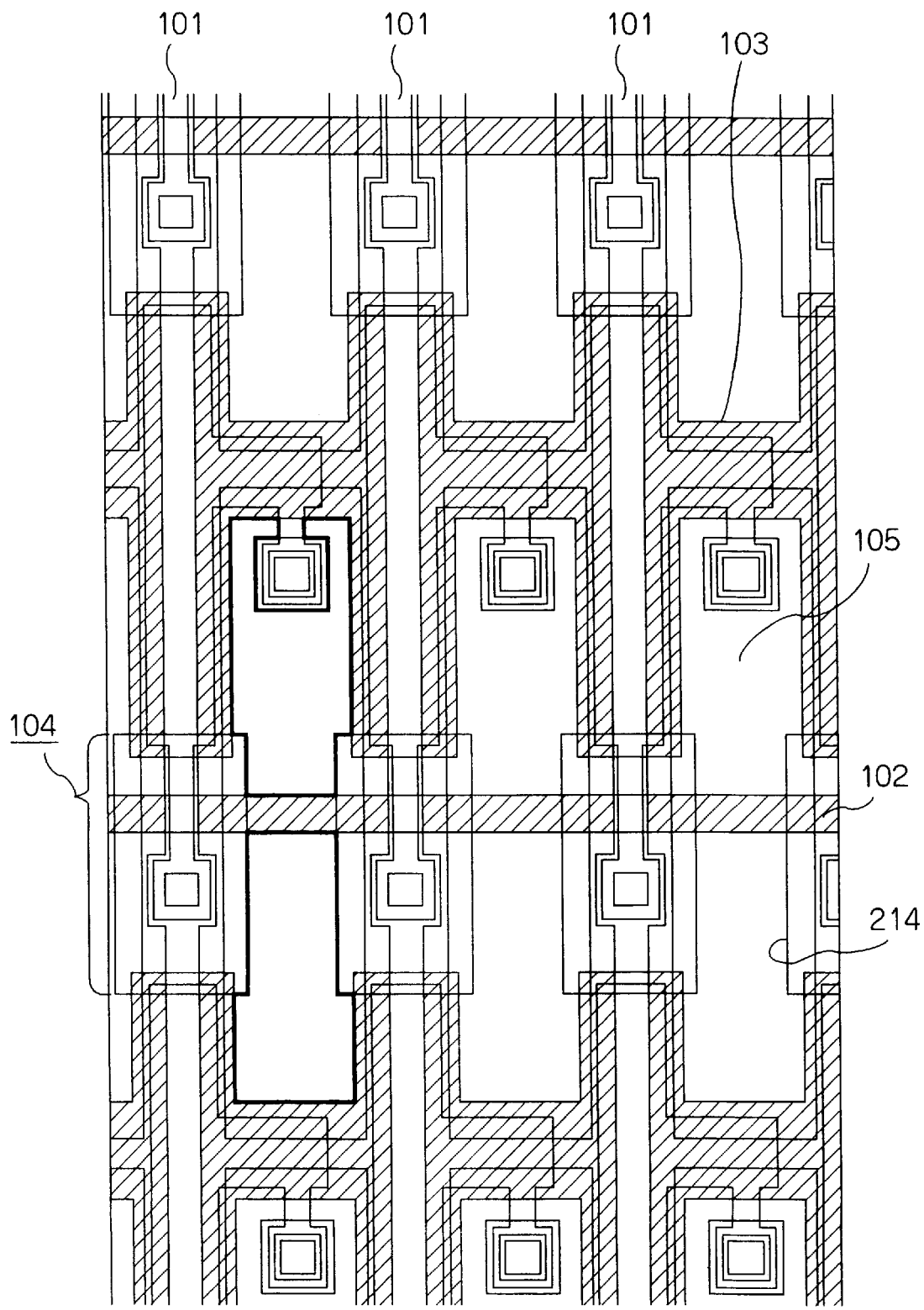
FIG. 11 is a plan view showing a pixel portion of a liquid crystal display apparatus according to a modification of the third embodiment of the present invention.

FIG. 11 is a plan view showing the liquid crystal display apparatus according to a modification of the third embodiment shown in FIG. 10. In this modification, an auxiliary capacitor line 103 is also disposed such that it overlaps with peripheral portions of an upper edge portion and a lower edge portion of a pixel electrode 105. Thus, the aperture ratio is further improved.

As shown in FIG. 11, since the signal line 103 is disposed below the signal line 101, the auxiliary capacitor line 103 functions as a light insulation film as with the black matrix 214. Thus, the area of the light insulation film increases. Consequently, since an auxiliary capacitor 106 can be formed below the signal line 101, the aperture ratio of the pixel portion can improved the third embodiment shown in FIG. 10.

Figure 12:
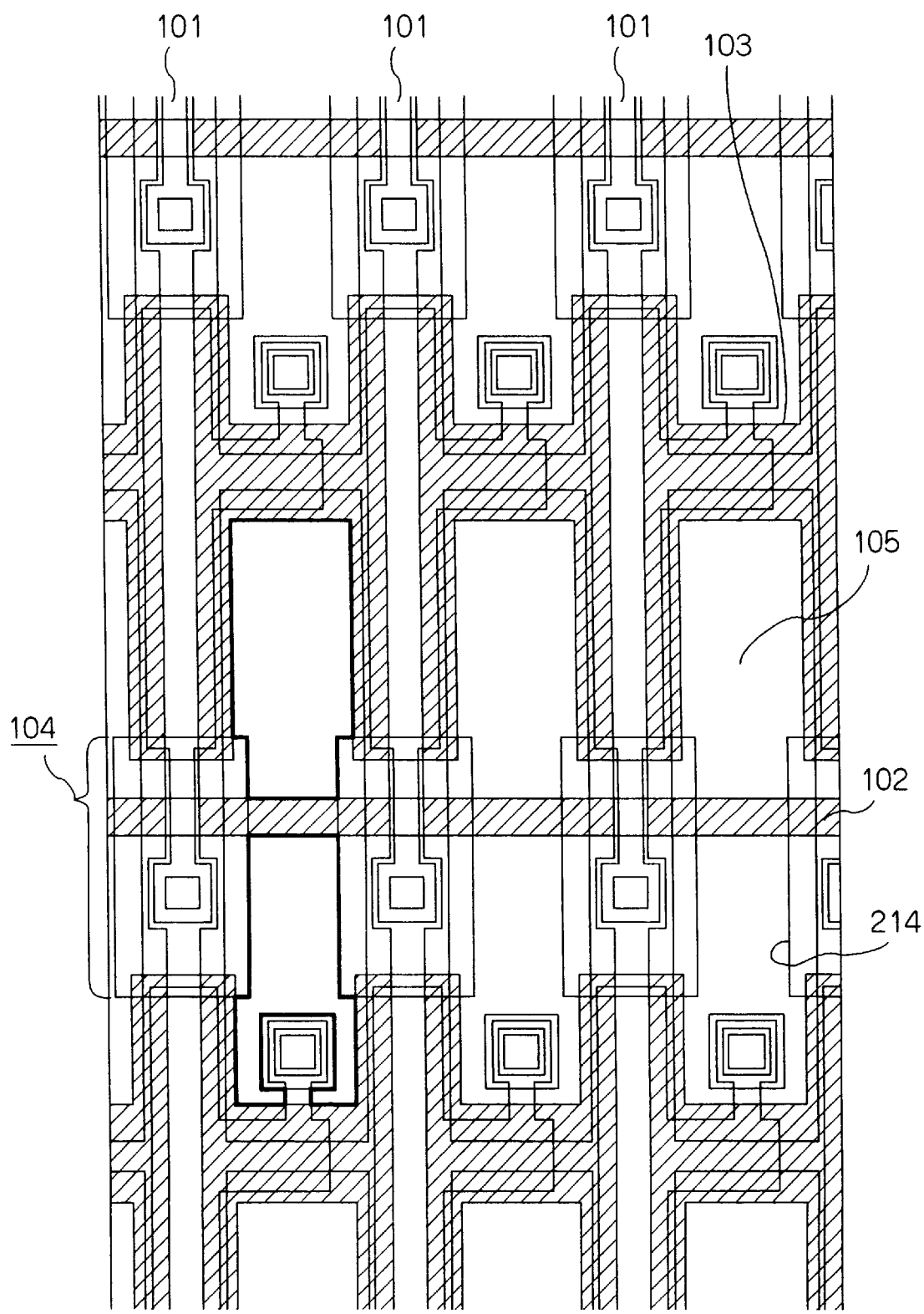
FIG. 12 is a plan view showing a pixel portion of a liquid crystal display apparatus according to a fourth embodiment of the present invention.

FIG. 12 is a plan view showing a pixel portion of a liquid crystal display apparatus according to a fourth embodiment of the present invention.

One of a source terminal and a drain terminal of a TFT 104 is connected to a signal line 101. The other terminal is connected to a pixel electrode 105 through a lower layer of an auxiliary capacitor line 103 to form an auxiliary capacitor 106. The pixel electrode 105 is disposed such that it overlaps with a scanning line 102 of the preceding line or the next line of the matrix.

As shown in FIG. 12, since the scanning line 102 that supplies a scanning pulse for controlling the TFT 104 does not overlap with the pixel electrode 105 to which a picture signal is written, a penetration voltage due to a stray capacitor formed between the scanning line 102 and the pixel electrode 105 can be suppressed. Thus, a write error of the picture signal can be prevented, thereby display quality.

Figure 13:
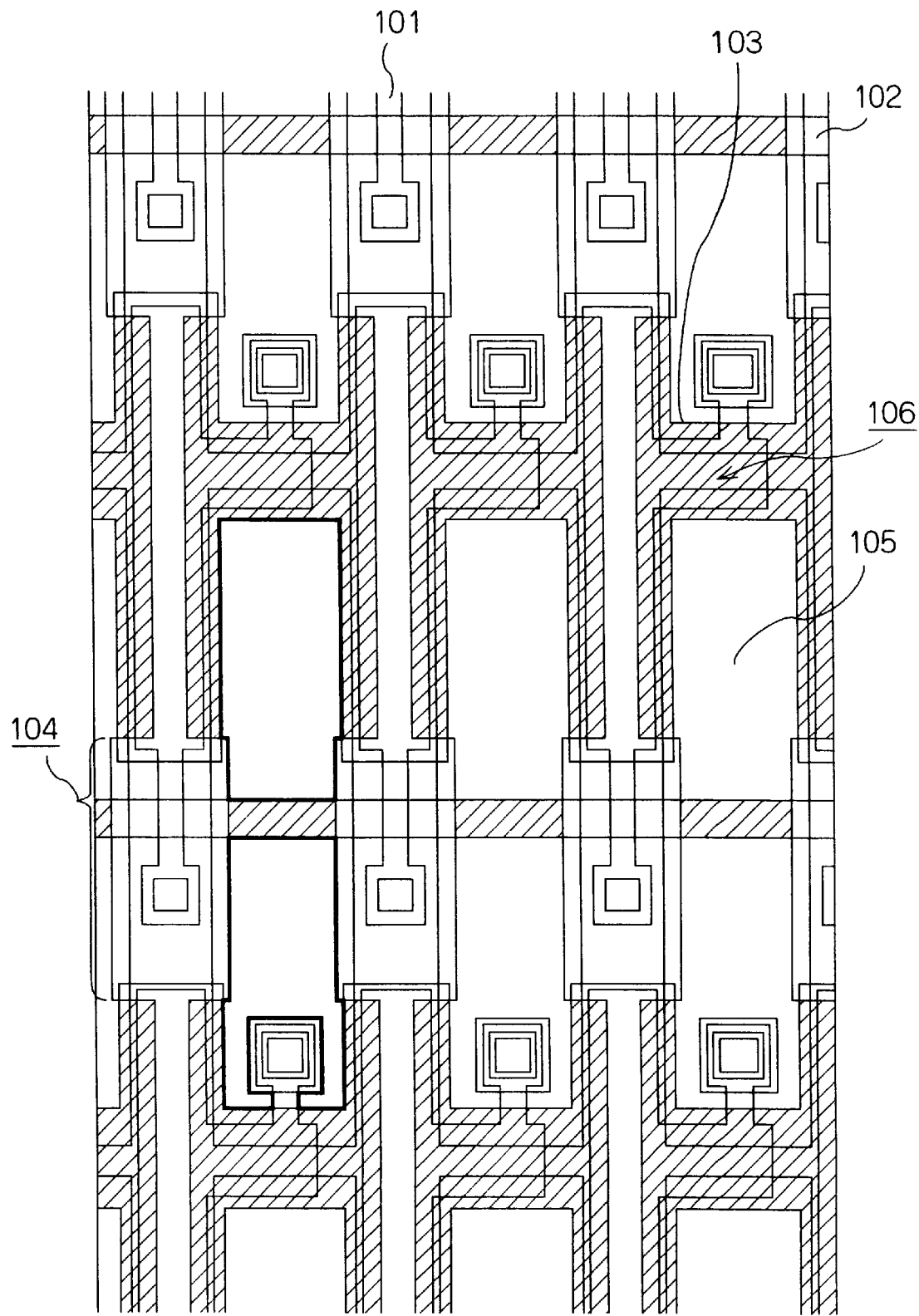
FIG. 13 is a plan view showing a pixel portion of a liquid crystal display apparatus according to a fifth embodiment of the present invention.

FIG. 13 is a plan view showing a pixel portion of a liquid crystal display apparatus according to a fifth embodiment of the present invention.

A left edge portion and a right edge portion of a pixel electrode 105 overlap with a signal line 101 through an insulation film (not shown). Thus, the signal line 101 can be used as a light insulation film instead of a black matrix.

On the other hand, an upper edge portion and a lower edge portion of the pixel electrode 105 are optically shielded with the same structure as those of the above described embodiments. Thus, the black matrix 214 of the above-described embodiments can be omitted.

In such a structure, the black matrix that is essential to the conventional liquid crystal display apparatus can be omitted in the invention. Thus, it is not necessary to consider the alignment accuracy in the cell forming step and the machining accuracy in the black matrix forming step. Consequently, the aperture ratio of the pixel portion can be improved in comparison with the conventional liquid crystal display apparatus.

Figure 14:
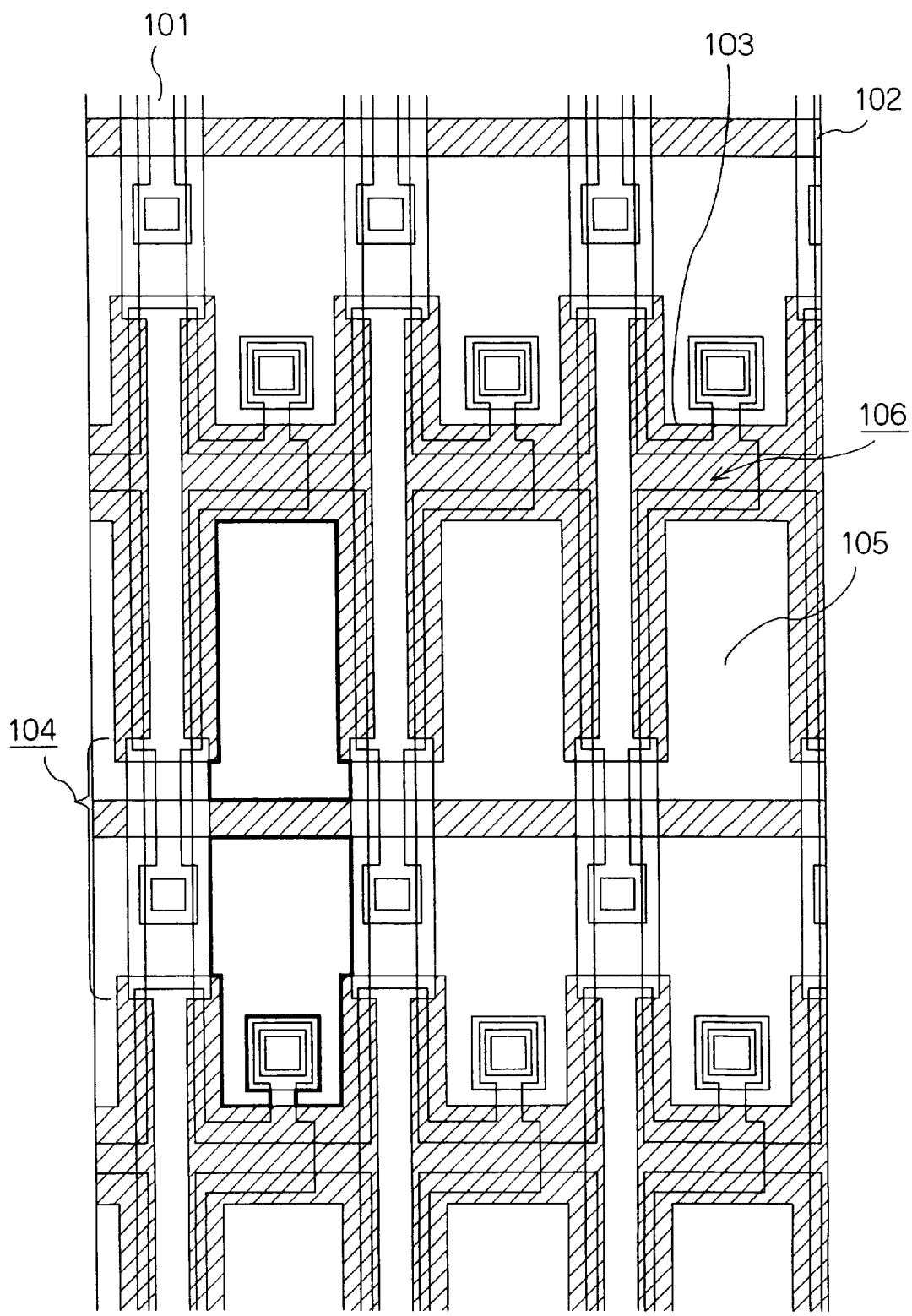
FIG. 14 is a plan view showing a pixel portion of a liquid crystal display apparatus according to a modification of the fifth embodiment of the present invention.

FIG. 14 is a plan view showing a liquid crystal display apparatus according to a modification of the fifth embodiment shown in FIG. 13. In the modification shown in FIG. 14, the distance between a pixel electrode 105 and a signal line 101 is smaller than that in the fifth embodiment. Thus, the area of the signal line 101 that functions as a black matrix decreases. Consequently, the aperture ratio of the pixel portion further improves the liquid crystal display apparatus according to the fifth embodiment shown in FIG. 13.

Figure 15:
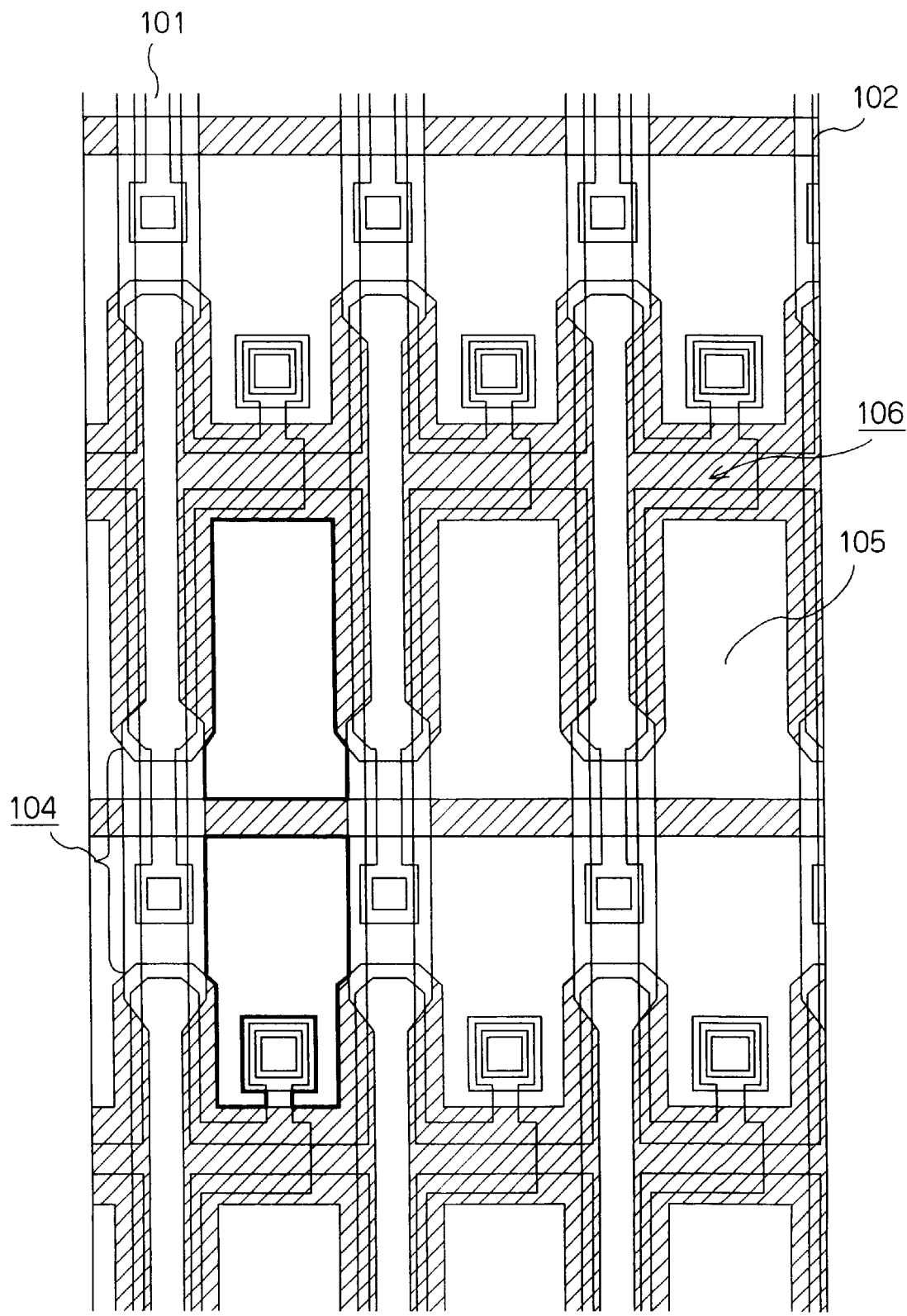
FIG. 15 is a plan view showing a pixel portion of a liquid crystal display apparatus according to another modification of the fifth embodiment of the present invention.

FIG. 15 is a plan view showing a liquid crystal display apparatus according to another modification of the fifth embodiment shown in FIG. 14. In this modification shown in FIG. 15, a corner portion of an auxiliary capacitor line 103 is formed with an angle of 45°.

In this structure, without needing to decrease the electric capacitance of an auxiliary capacitor 106, the loss area of the aperture portion due to the auxiliary capacitor line 103 can be decreased. In other words, the area of the aperture portion can be further increased and thereby the aperture ratio of the pixel portion can be further improved.

FIG. 16 is a schematic diagram showing an example of a driving method of a liquid crystal display apparatus according to the present invention.

As shown in FIG. 16, when a picture signal is written to a pixel electrode 105, the polarity of a picture signal is inverted for each line or each dot. Thus, the voltage of the signal line becomes the same as the center value of the drive amplitude of the picture signal. Consequently, the cross-talk in the vertical direction due to a stray capacitance between the signal line 101 and the pixel electrode 105 can be suppressed. As a result, the display quality of the liquid crystal display apparatus can be remarkably improved.

It should be noted that the present invention is not limited to the above-described embodiments. Instead, as long as both edge portions of a pixel electrode that are parallel to a signal line overlap with an auxiliary capacitor line through an insulation film and a scanning line overlaps with the pixel electrode, the aspect ratio of each pixel may be not 3:1. Even if the shape of each line and space thereof differ from each other, the same effects can be accomplished.

In addition, in the case that the liquid crystal display apparatus is used as a direct view type display, when lines in a display region are shielded by a low reflecting material such as chromium oxide or a light absorbing black resin material, the display quality can be further improved.

The outer light reflection preventing effect of the low reflecting material can be accomplished regardless of whether the low reflecting material is formed on an opposite substrate or an array substrate. In the case that the low reflecting material is formed on a matrix array substrate, with a rear surface exposing step using a mask of each line in the display region, the resultant process including the forming step of the low reflecting material can be simplified.

Thus, according to the present invention, a liquid crystal display apparatus that improves both the aperture ratio of the pixel portion and the display quality creates a picture display with high luminance, high contrast ratio, and high picture quality.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A liquid crystal display apparatus, comprising;
   a plurality of scanning lines and a plurality of signal lines, said plurality of scanning lines and said plurality of signal lines being disposed on an insulating substrate such that said plurality of scanning lines intersect with said plurality of signal lines on the insulating substrate to form intersections;
   a plurality of switching devices, one of said plurality of switching devices being disposed at each of the intersections of said plurality of scanning lines and said plurality of signal lines;
   a plurality of display pixel electrodes, one of said plurality of display pixel electrodes being electrically connected to each of said plurality of switching devices;
   an opposite electrode disposed opposite to said plurality of display pixel electrodes through a liquid crystal layer;
   a plurality of auxiliary capacitor lines, one of said plurality of auxiliary capacitor lines being disposed in each space between a pair of adjacent display pixel electrodes corresponding to different scanning lines and capacitively coupled with said pair of said display pixel electrodes to form a plurality of auxiliary capacitors;
   wherein one of said plurality of display pixel electrodes is capacitively coupled with two of said plurality of auxiliary capacitor lines adjacent to each other,
   wherein two of said auxiliary capacitor lines overlap with opposite edges of one of said plurality of display pixel electrodes; and
   wherein one of said plurality of scanning lines is disposed between two of said plurality of auxiliary capacitor lines adjacent to each other.

2. The liquid crystal display apparatus as set forth in claim 1, a selected one of said plurality of said scanning lines are supplied sequentially to a switching device connected to display pixel an adjacent pixel electrode overlapping with said selected
   wherein said plurality of scanning lines have a first scanning line and a second scanning line adjacent to said first scanning line,
   wherein a scanning signal for said second scanning line is supplied next to said first scanning line; and
   wherein one of said plurality of display pixel electrodes corresponding to said second scanning line overlaps with said first scanning line.

3. The liquid crystal display apparatus as set forth in claim 1, further comprising at least a first insulation layer and a second insulation layer disposed between said plurality of scanning lines and said plurality of display pixel electrodes.

4. The liquid crystal display apparatus as set forth in claim 3, wherein said first insulation layer is disposed between said plurality of scanning lines and said plurality of signal lines, and wherein said second insulation layer is disposed between said plurality of signal lines and said plurality of display pixel electrodes.

5. The liquid crystal display apparatus as set forth in claim 4, wherein an edge portion of at least one of said plurality of display pixel electrodes overlaps with at least one of said plurality of signal lines through said second insulation layer.

6. The liquid crystal display apparatus as set forth in claim 1, wherein each of said plurality of auxiliary capacitor lines is composed of a light shielding material.

7. The liquid crystal display apparatus as set forth in claim 1, wherein each of said plurality of auxiliary capacitor lines is composed of a transparent material.

8. The liquid crystal display apparatus as set forth in claim 7, wherein a light shielding layer is disposed in a contour of each of said plurality of auxiliary capacitor lines.

9. The liquid crystal display apparatus as set forth in claim 1, wherein each of said plurality of switching devices is a thin film transistor, and wherein a channel of each of said thin film transistor is disposed such that it overlaps with one of said plurality of signal lines.

10. The liquid crystal display apparatus as set forth in claim 1, wherein a signal whose polarity is inverted for each line or each of said plurality of display pixel electrodes is supplied to said plurality of signal lines.

11. The liquid crystal display apparatus as set forth in claim 1, wherein a voltage that is substantially the same as a voltage supplied to said opposite electrode is supplied to each of said plurality of auxiliary capacitor lines.

12. The liquid crystal display apparatus comprising;
a plurality of scanning lines and a plurality of signal lines, said plurality of scanning lines and said plurality of signal lines being disposed on an insulating substrate such that said plurality of scanning lines intersect with said plurality of signal lines on the insulating substrate to form intersections;
a plurality of switching devices, one of said plurality of switching devices being disposed at each of the intersections of said plurality of scanning lines and said plurality of signal lines;
a plurality of display pixel electrodes, one of said plurality of display pixel electrodes being electrically connected to each of said plurality of switching devices;
an opposite electrode disposed opposite to said plurality of display pixel electrodes through a liquid crystal layer;
a plurality of auxiliary capacitor lines, one of said plurality of auxiliary capacitor lines being disposed in each space between a pair of adjacent display pixel electrodes corresponding to different scanning lines and capacitively coupled with said pair of said display pixel electrodes to form a plurality of auxiliary capacitors;
wherein one of said plurality of display pixel electrodes is capacitively coupled with two of said plurality of adjacent auxiliary capacitor lines;
wherein two of said auxiliary capacitor lines overlap with opposite edges of one of said plurality of display pixel electrodes;
wherein one of said plurality of scanning lines is disposed between two of said plurality of auxiliary capacitor lines adjacent to each other; and
wherein at least one of said plurality of auxiliary capacitor lines overlaps with a semiconductor layer electrically connected to at least one of said plurality of display pixel electrodes to form at least one of said plurality of auxiliary capacitors.

* * * * *

UNITED STATES PATENT AND TRADEMARK OFFICE
CERTIFICATE OF CORRECTION

PATENT NO.   : 6,268,894 B1
DATED        : July 31, 2001
INVENTOR(S)  : Aoki et al.

It is certified that error appears in the above-identified patent and that said Letters Patent is hereby corrected as shown below:

Column 2,
Line 14, delete "of";
Line 37, change "comprise" to -- comprises --;

Column 5,
Line 32, change "filed" to -- field --.
Line 35, change "decreased a" to -- decreasing --;
Line 45, before "In" insert a new paragraph;

Column 6,
Line 30, delete "in";
Line 35, delete "taking place";

Column 8,
Line 14, change "improved" to -- improve --;
Line 32, after "thereby" insert -- improving --;

Column 10,
Line 20, delete "a selected one of said plurality of said scanning lines are";
Line 21, delete the entire line;
Line 22, delete the entire line;
Line 23, delete the entire line; and Column 11,
Line 1, change ";" to -- : --.

Signed and Sealed this

Thirteenth Day of August, 2002

*Attest:*

JAMES E. ROGAN
*Attesting Officer*  *Director of the United States Patent and Trademark Office*